Figure 1:
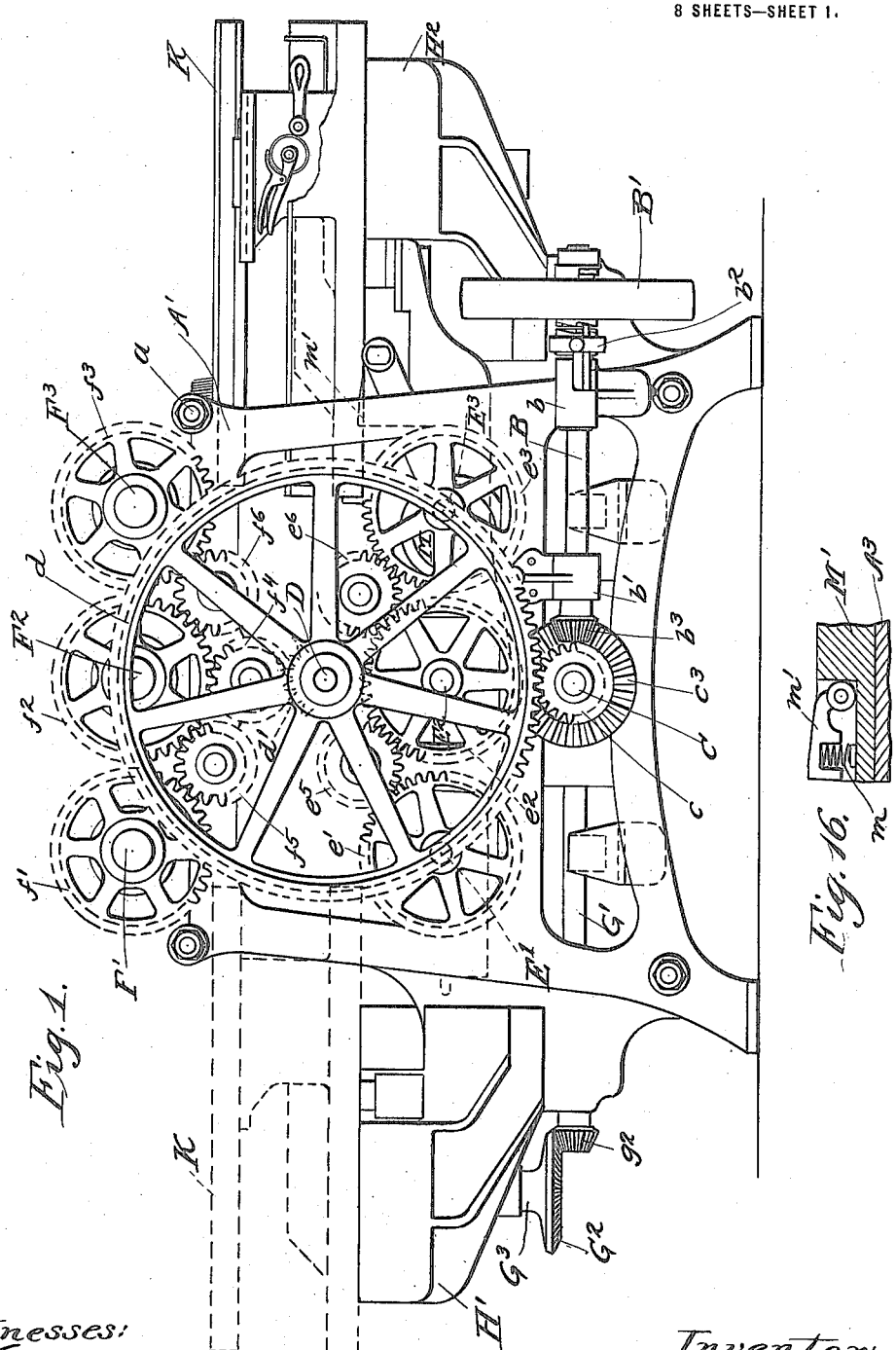

W. R. HAGER.
IRONING MACHINE.
APPLICATION FILED MAY 24, 1915.

1,208,311.

Patented Dec. 12, 1916.
8 SHEETS—SHEET 5.

Witnesses:
C. C. Burnap

Inventor:
William R. Hager
By Sheridan, Wilkinson & Scott, Attys

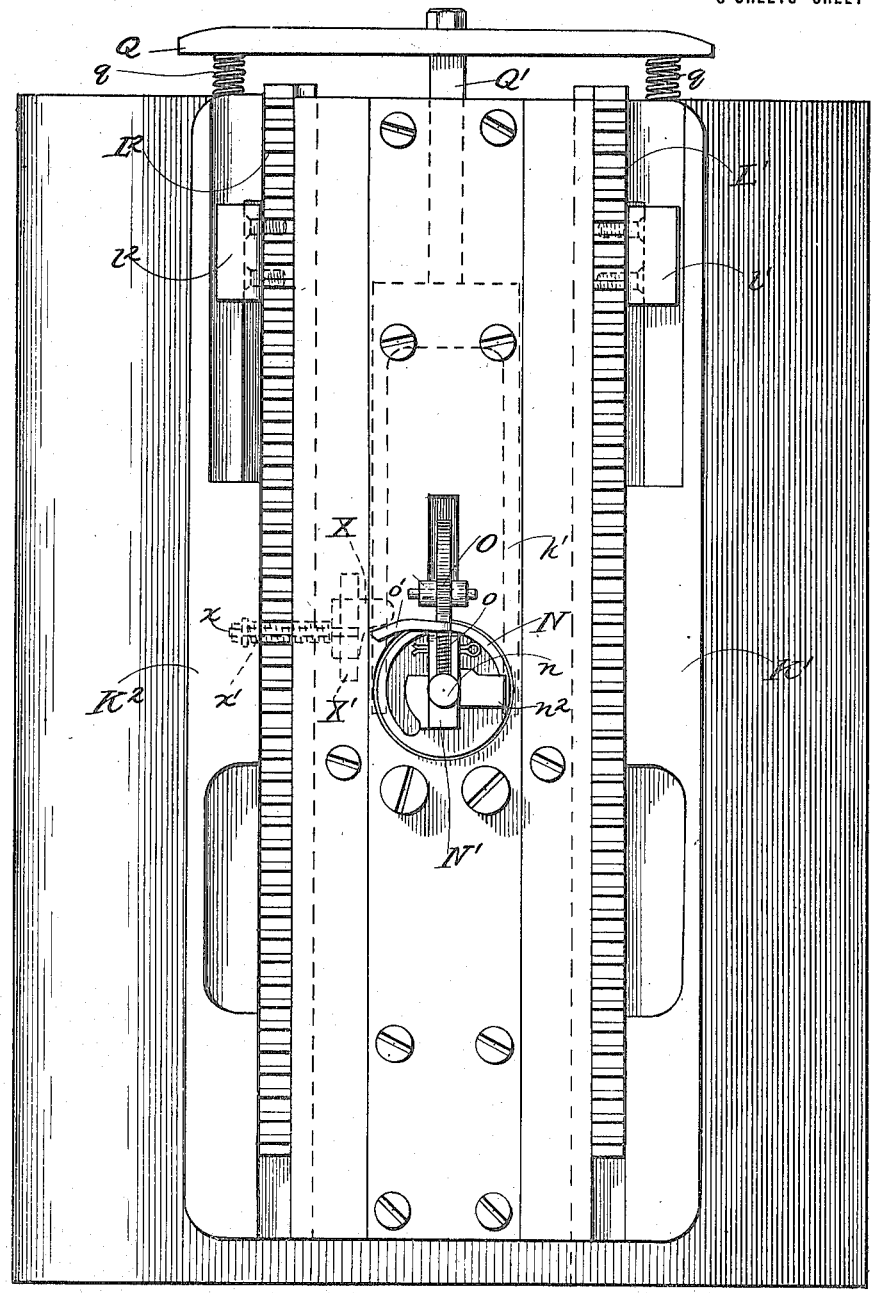

W. R. HAGER.
IRONING MACHINE.
APPLICATION FILED MAY 24, 1915.
1,208,311.
Patented Dec. 12, 1916.
8 SHEETS—SHEET 7.
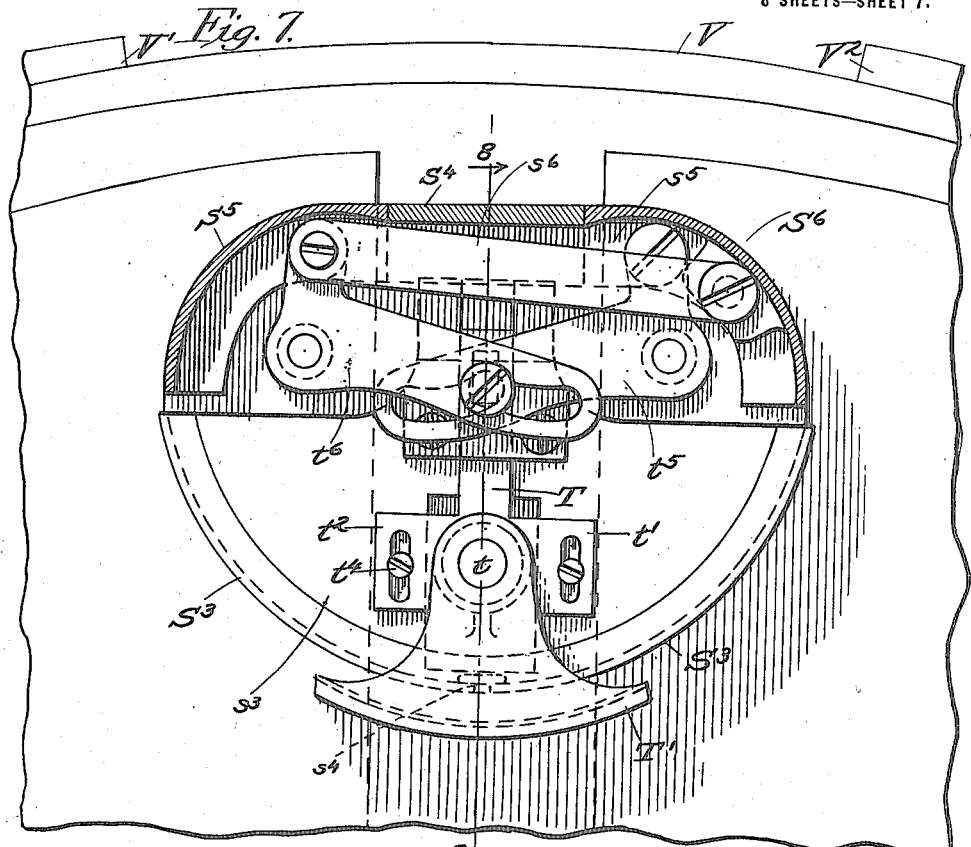
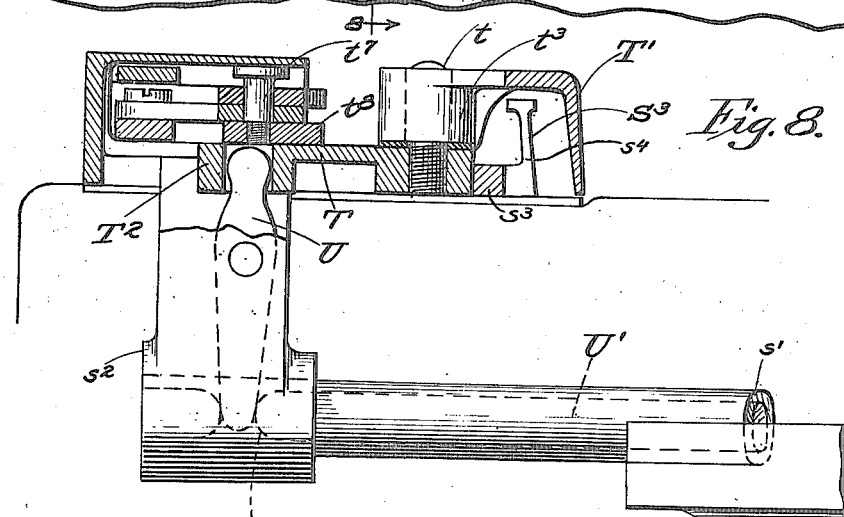

W. R. HAGER.
IRONING MACHINE.
APPLICATION FILED MAY 24, 1915.
1,208,311.
Patented Dec. 12, 1916.
8 SHEETS—SHEET 8.
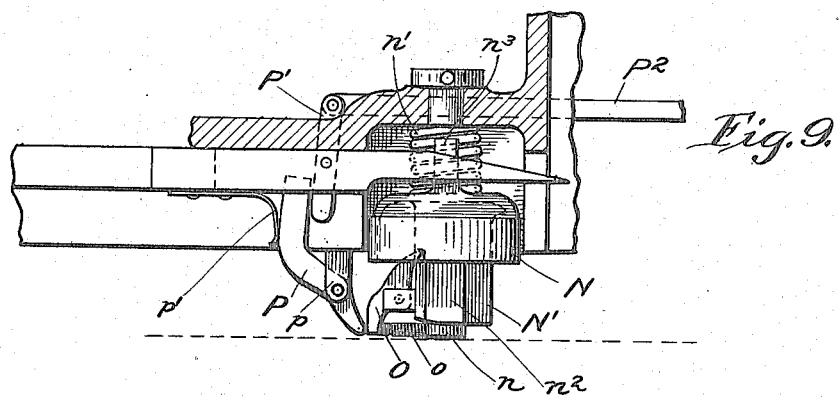
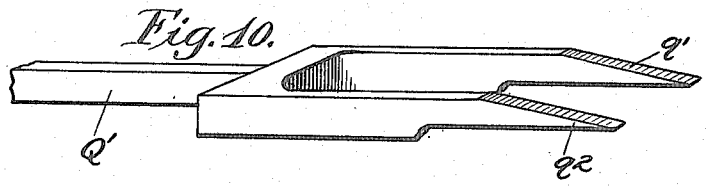
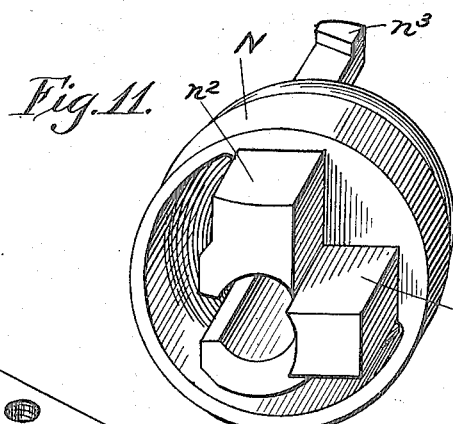
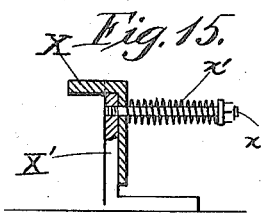
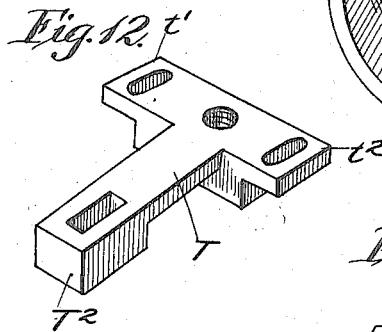
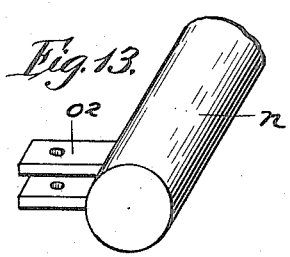
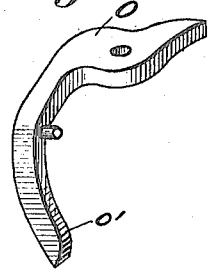
Witnesses
C. E. Burnap
Inventor:
William R. Hager
By Sheridan, Wilkinson & Scott, Att'ys

UNITED STATES PATENT OFFICE.

WILLIAM R. HAGER, OF CHICAGO, ILLINOIS.

IRONING-MACHINE.

1,208,311.  Specification of Letters Patent.  Patented Dec. 12, 1916.

Application filed May 24, 1915. Serial No. 30,087.

*To all whom it may concern:*

Be it known that I, WILLIAM R. HAGER, a citizen of the United States, residing at Chicago, in the county of Cook and State of Illinois, have invented certain new and useful Improvements in Ironing-Machines, of which the following is a specification.

My invention relates in general to ironing machines, and more particularly to machines for ironing shirt bosoms of the general type shown in Patent No. 924,769 granted to me on June 15, 1909.

In machines of the construction referred to for ironing shirt bosoms, the shirts are supported upon boards which are carried beneath heated ironing cylinders having recesses to receive the neck bands of the shirts. Inasmuch as the sizes of the neck bands of shirts vary, it is desirable that the supporting boards should be provided with an adjustable neck band support so that the neck band of any size of shirt may be fully distended and the surface of the bosom around the neck band thereby lie smooth upon the board. It is further desirable that the yokes of shirts of all sizes should uniformly fit upon the front end of the board as it passes beneath the ironing cylinders, and hence the front portion of the neck band support should be moved toward the rear end of the board in making adjustments for different sizes of shirts. Such adjustment of the neck band support would, however, position the same out of registry with the recesses in the ironing cylinders unless corresponding adjustment were made in the movement of the board into engagement with the cylinders.

A primary object of my invention is to provide a machine for ironing shirt bosoms in which the neck bands of all sizes of shirts may be fully distended and at the same time brought into exact registry with the recesses in the ironing cylinders.

A further object of my invention is to provide a machine of the character referred to, in which, simultaneously with the adjustment of the neck band support, a corresponding adjustment in the means for feeding the shirt supporting board beneath the ironing cylinders, will be effected, so as to secure exact registry of the neck band with the receiving recess in the cylinders.

A further object of my invention is to provide in a machine for successively ironing the bosom of a plurality of shirts, improved mechanism for automatically stopping the shirt carriers at desired points in their travel, and for permitting the carriers to resume their travel toward the ironing cylinders.

A final object of my invention is to provide a machine for ironing shirt bosoms which will be comparatively simple in construction, convenient in operation, and efficient in use.

My invention will be more fully hereinafter disclosed with reference to the accompanying drawings, in which the same is illustrated as embodied in a convenient and practical form, and in which—

Figure 2:
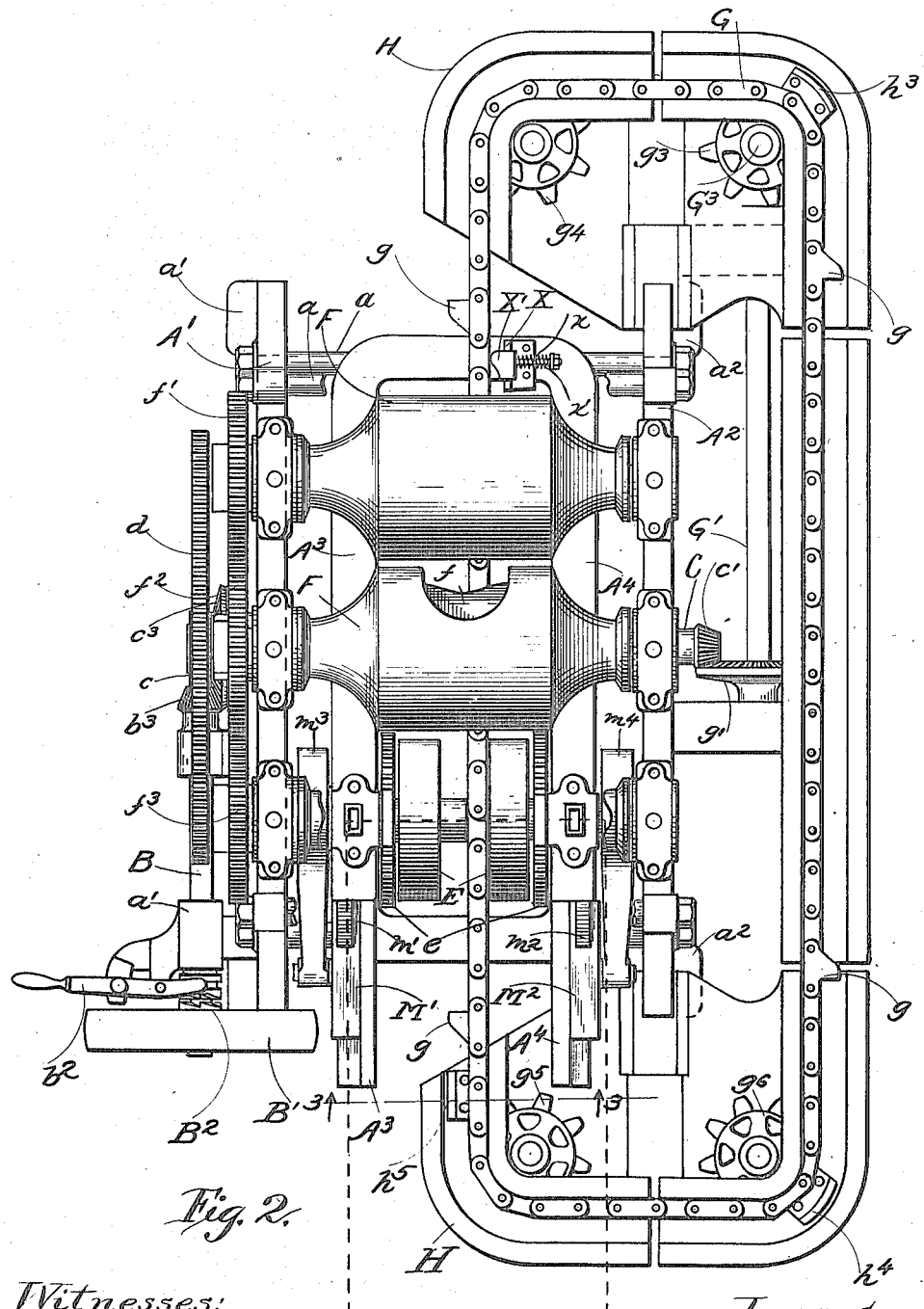
Figure 3:
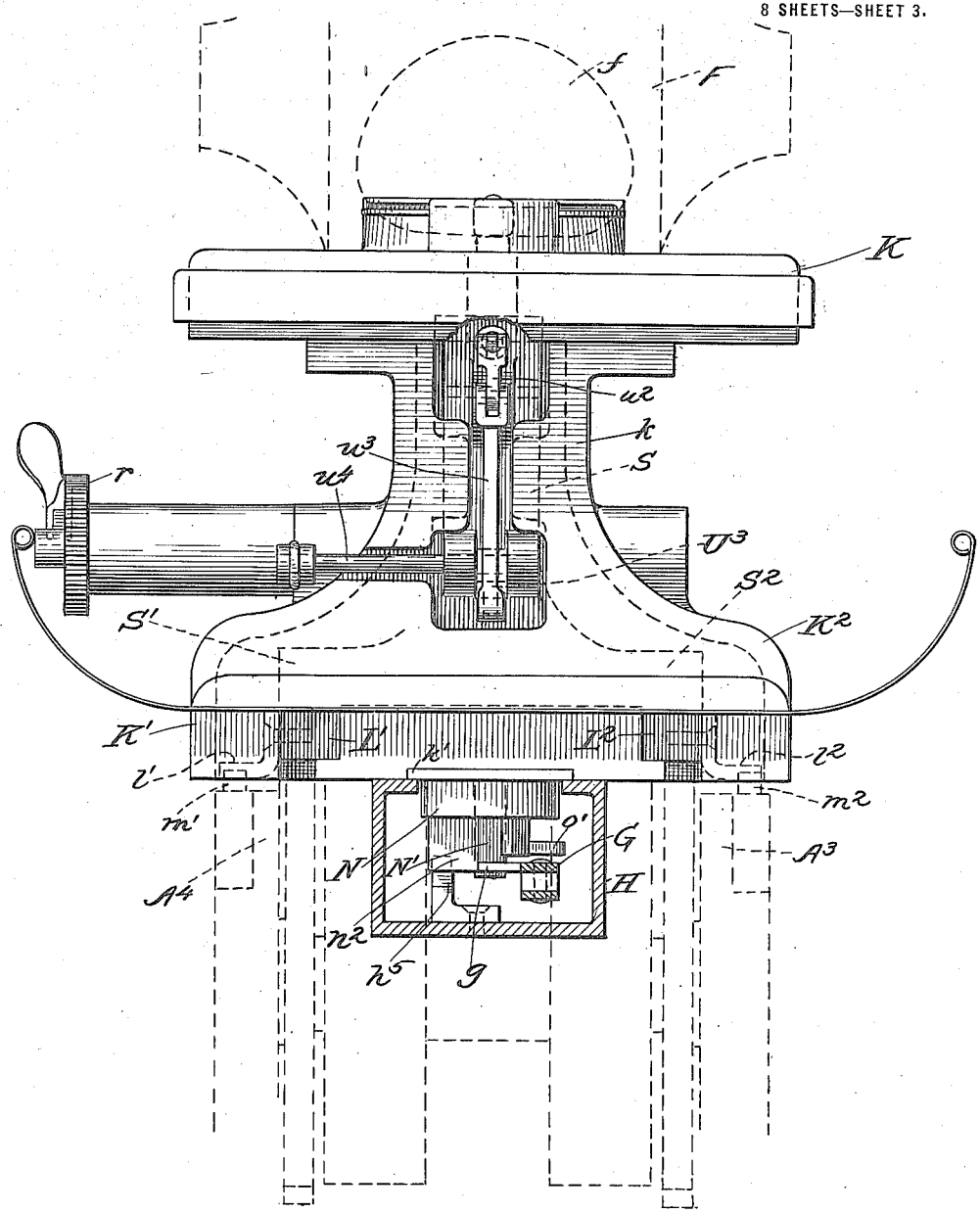
Figure 4:
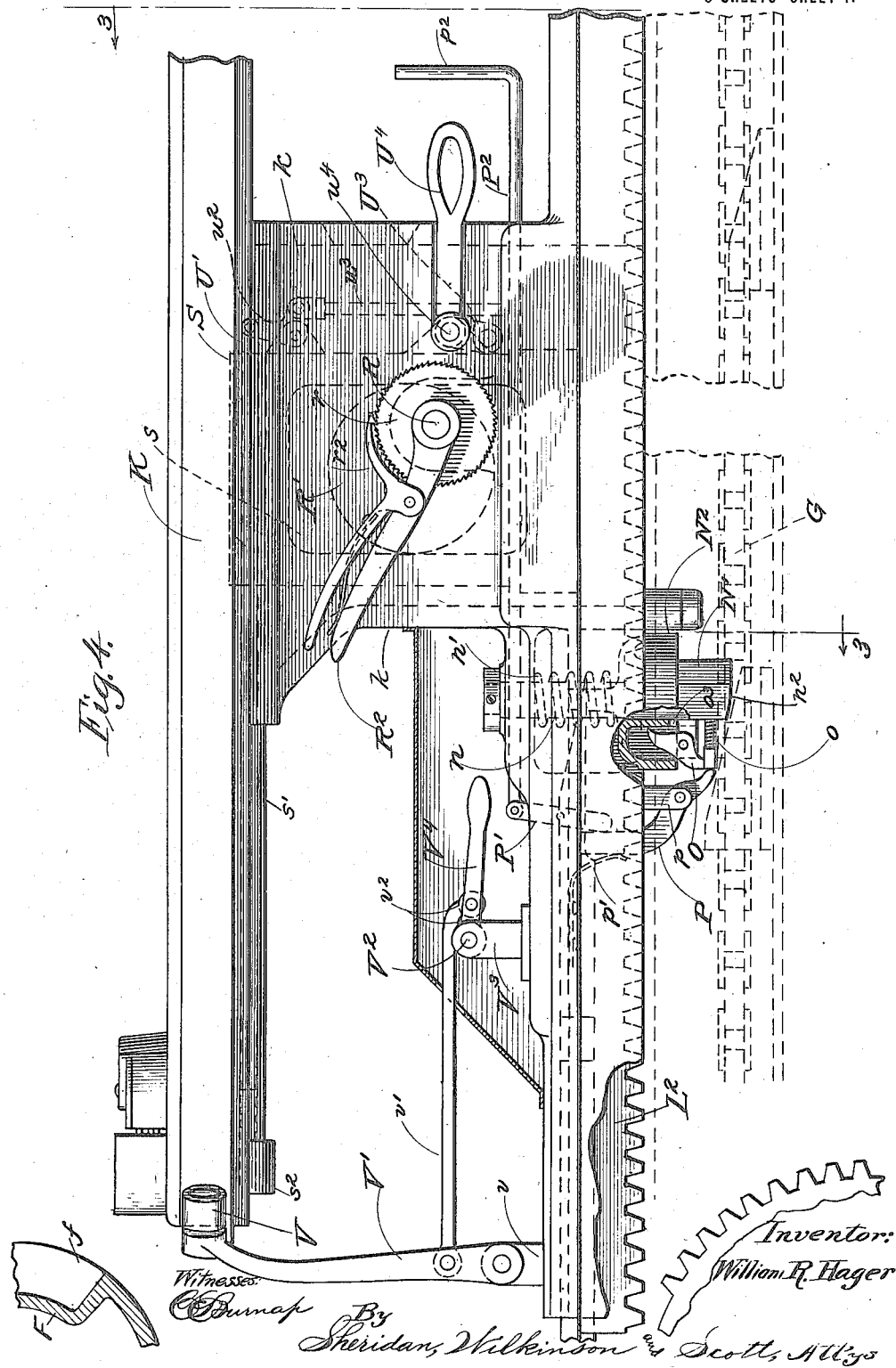
Figure 5:
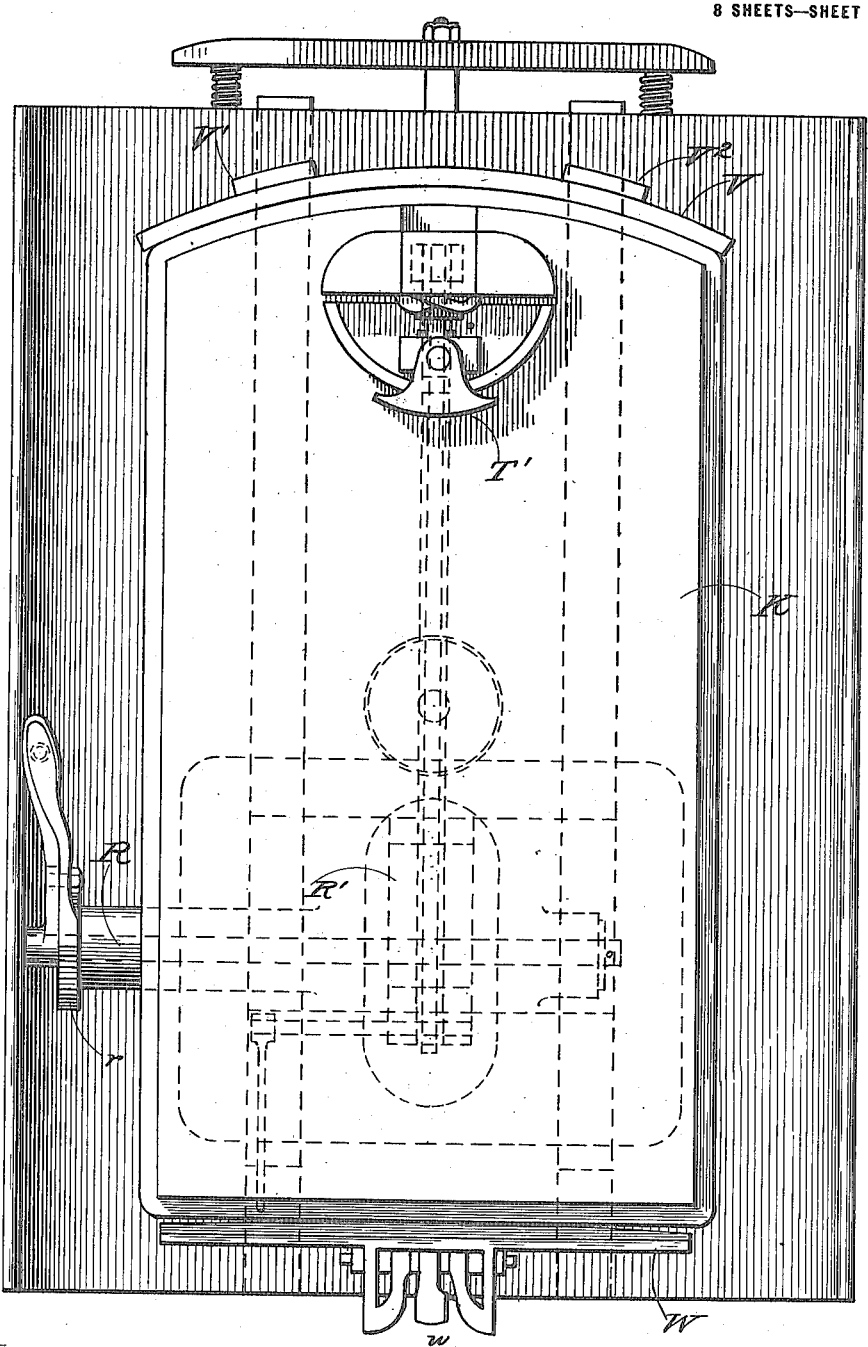

Figure 1 is a side elevation; Fig. 2 is a plan view; Fig. 3 is an enlarged elevational and part sectional view, looking from the right in Fig. 4 on line 3—3, of one of the shirt-carrying boards, and supporting mechanism therefor; Fig. 4 is a side elevational view of the shirt board looking from the left in Fig. 3; Fig. 5 is a top plan view of one of the shirt supporting boards; Fig. 6 is a plan view of the underside of one of the shirt supporting boards; Fig. 7 is an enlarged plan view of the forward end of one of the shirt supporting boards showing the adjustable neck band support; Fig. 8 is a sectional view along the line 8—8 of Fig. 7; Fig. 9 a detail elevational and part sectional view of the mechanism for coupling the shirt supporting board with the endless conveyer; Fig. 10 a detail elevational view of a member coöperating with the coupling member. Fig. 11 a detail perspective view of the coupling member; Fig. 12 a perspective view of a part of the neck band clamping mechanism; Fig. 13 a perspective view of the lower portion of the supporting post for the coupling member; Fig. 14 a detached perspective view of the pawl for supporting the coupling member in elevated position; Fig. 15 a detail sectional view of the tripping device; and Fig. 16 a sectional detail view of one of the spring-actuated dogs for engaging the shirt supporting board.

The same reference characters are used to designate the same parts in the several figures of the drawings.

Referring more particularly to Figs. 1 and 2, reference characters A′ and A² designate two spaced parallel supporting frames which are rigidly connected together by means of transverse connecting rods *a*. B designates a driving shaft journaled upon the frame A' in suitable brackets $b$—$b'$. Any suitable power transmitting means may be provided for rotating the shaft B, such, for instance, as a belt pulley B' mounted on one end of the shaft and adapted to be non-rotatably clutched thereto by means of any suitable clutching mechanism, such as indicated at $b^2$. On the end of the shaft B, opposite the end on which the belt pulley B' is located, is a bevel pinion $b^3$ which meshes with a bevel gear $c^3$ fixed to one end of a transverse shaft C suitably journaled adjacent its ends upon the supporting side frames A' and $A^2$. Fixed upon the shaft C, adjacent the bevel gear $c^3$ is a pinion $c$ which meshes with a gear wheel $d$, the latter being suitably journaled upon the supporting frame. A small gear wheel $d'$ is fixed upon the shaft D to which also is fixed the gear wheel $d$. The gear wheel $d'$ meshes with a larger gear wheel $e^2$ fixed upon one end of a transverse shaft $E^2$. the latter being suitably journaled upon the supporting frame. On opposite sides of and parallel to the shaft $E^2$, are similar shafts E' and $E^3$, on which are respectively fixed gear wheels $e'$ and $e^3$, which mesh with pinions $e^5$ and $e^6$, which in turn are in mesh with the gear wheel $e^2$. Mounted upon each of the transverse shafts E', $E^2$ and $E^3$ are pairs of spaced rollers E. Fixed upon each of the said shafts E', $E^2$ and $E^3$ are spaced pairs of gear wheels $e$, the gear wheels on the shaft $E^3$ having interrupted portions, for a purpose hereinafter described. Journaled in suitable bearings upon the side frames A' and $A^2$ above the shafts E', $E^2$ and $E^3$ are shafts F', $F^2$ and $F^3$, and upon each of said shafts is fixed a hollow cylinder F provided with suitable means (not shown) for having heat imparted to it, as by means of steam. Each of the cylinders F is provided with a recess $f$ in its cylindrical surface, the function of which will be later described. Fixed upon corresponding ends of the shafts F', $F^2$ and $F^3$ are gear wheels $f'$, $f^2$ and $f^3$, respectively. The gear wheel $f^2$ meshes with a gear wheel $f^4$, which in turn is in mesh with a small gear wheel $d'$. A gear wheel $f^5$ meshes with both of the gear wheels $f'$ and $f^2$, while another gear wheel $f^6$ meshes with both of the gear wheels $f^2$ and $f^3$. By means of the above-described mechanism the upper surfaces of the pairs of rollers on the shafts E', $E^2$ and $E^3$ move in the same direction, while the lower surfaces of the cylinders fixed upon the shafts F', $F^2$ and $F^3$ also move in the same direction.

G designates an endless chain conveyer having a horizontal path of movement within a channel-shaped supporting track H, the latter being suitably supported as by means of outwardly projecting brackets H' and $H^2$. The chain G extends around and is guided by four sprocket wheels $g^3$, $g^4$, $g^5$ and $g^6$ mounted upon vertical axes on the supporting frame. One of the sprocket wheels $g^3$ is fixed upon the upper end of a vertical shaft $G^3$, the lower end of such shaft having fixed thereto a bevel gear $G^2$ which meshes with a bevel pinion $g^2$ fixed upon the end of a shaft G'. The vertical shaft $G^3$ and horizontal shaft G' are suitably journaled in the bearings upon the supporting framework. A bevel gear $g'$ is fixed upon the shaft G' and meshes with a bevel pinion $c'$, fixed upon the end of the transverse shaft C. It will be seen that by means of the above-described power-transmitting mechanism movement is imparted to the sprocket chain G, whenever power is applied to the shaft B.

K designates a board for supporting a shirt, the said board comprising an upper padded surface upon which rests the shirt bosom. The board K is mounted upon the top of a pedestal $k$, the base of which spreads outwardly in a transverse direction, as shown in Fig. 3, so that the side portions K' and $K^2$ thereof are spaced apart a distance corresponding to the distance between the parallel rails $A^3$ and $A^4$ which are located intermediate of the supporting side frames A' and $A^2$ (see Fig. 2). Rack-bars L' and $L^2$ are carried by, and are longitudinally adjustable relatively to the side portions K' and $K^2$ of the base upon which the board K is supported. The rack-bars K' and $K^2$ are provided with outwardly projecting lugs $l'$ and $l^2$ (see Figs. 3 and 6) which extend into the paths of reciprocation of two spring-supported dogs $m'$ and $m^2$, the latter being mounted upon blocks M' and $M^2$, which are guided upon the ends of the parallel rails $A^3$ and $A^4$. A reciprocating movement is imparted to the blocks M' and $M^2$ by means of eccentrics M (see Fig. 1), fixed upon the shaft $E^3$, and connected by means of straps and arms $m^3$ and $m^4$ with the respective blocks M' and $M^2$. The dogs $m'$ and $m^2$ are supported upon springs $m$ (see Fig. 16), so that they may yield downwardly to pass under the lugs $l'$ and $l^2$, but immediately upon the dogs passing behind the lugs $l'$ and $l^2$, the dogs are lifted upwardly by the springs so that when the eccentrics M move the blocks M' and $M^2$ toward the left in Fig. 1, the shirt board will be moved in the same direction.

In order that the shirt board K may be moved by the endless sprocket chain G into position for the board to be engaged by the dogs $m'$ and $m^2$, and by them properly positioned with respect to the ironing cylinders, the chain is provided with a series of spaced laterally projecting lugs $g$. Depending from the supporting base of the board K, is a post N', which is engaged by one of the lugs $g$ on the chain, thereby effecting the movement of the board with the chain. The post N′ is so connected with the base of the board that it may be moved vertically out of the path of the lug $g$, so as to disconnect the board from the chain G. To accomplish this the post N′ is secured to a circular flanged support N which surrounds and is guided upon a rod $n$. A spring $n'$ surrounds the rod $n$ and exerts a pressure upon the top of the support N. In order to retain the post N′ in a position above the path of the lugs $g$, a pawl O is fulcrumed upon ears $o^2$ on the lower end of the rod $n$ and is pressed away from rod $n$ by means of a spring $o$, so that its upper end will engage the notch $o^3$ (see Fig. 4) in the support N and thereby maintain the said support in an elevated position, so that the post N′ will occupy a position above the path of the lugs $g$. The post N′ is lifted out of engagement with any of the lugs $g$ at any predetermined point in the travel of the board with the chain G, by means of fixed cams $h^3$, $h^4$ and $h^5$, which are engaged by a laterally projecting lug $n^2$ carried by the post N′, and the support N thereby lifted against the tension of the spring $n'$ to a position in which the pawl O will engage the notch $o^3$.

In order to disengage the pawl O from the notch $o^3$, to permit the post N′ to depend into the path of the lugs $g$, a lever P is fulcrumed upon a bracket $p$ depending from the base of the shirt board K. The lower end of the lever P engages the lower end of the pawl O to oscillate the latter against the tension of the spring $o$. A spring $p'$ engages the upper end of the lever P to normally retain the same in position so as not to interfere with the oscillation of the pawl O, by the spring $o$. The lever P′ is fulcrumed upon the base of the shirt board K in position for its lower end to engage the upper end of the lever P on the opposite side from that which is engaged by the spring $p'$. The upper end of the lever P′ is pivotally connected to a rod P² which extends to the rear of the shirt board where it is provided with an upwardly projecting handle portion $p^2$ adapted to be grasped by the operator to effect the oscillation of the lever P′, which through the oscillation of the intermediate lever P oscillates the pawl O to release the support N.

Mounted upon the base of the shirt supporting board K is a buffer Q, connected to the outer end of a bar Q¹, mounted to slide longitudinally upon the base of the shirt board. Springs $q$ serve to normally project the buffer Q forwardly with respect to the shirt board. The bar Q¹ is bifurcated so as to extend around the upper portion of the member N which supports the coupling post N¹ (see Figs. 6, 9 and 10), the ends of the bifurcated portions of the bar Q¹ are wedge-shaped, as shown at $q^1$ and $q^2$, and extend beneath lugs $n^3$ supported upon the member N on opposite sides of the rod $n$. When the buffer Q is moved inwardly with respect to the board through contact with a board in front thereof, the bar Q¹ is moved inwardly, and the wedges $q^1$ and $q^2$, through engagement with the lugs $n^3$, lift the member N and with it the coupling post N′ so as to disengage the latter from the conveyer chain.

Located adjacent the path of the conveyer G, at a point near the last of the rollers F under which the shirt bosom passes, is a yielding tripping block X, located in the path of the laterally projecting tail piece $o^1$ of the pawl O. The tripping block X is mounted in any suitable manner upon a supporting structure so as to yield laterally, as by means of a spring $x^1$ surrounding a rod $x$, the spring being interposed between the trip X and a head $x^2$ on the end of the rod, the rod passing through the hole in the tripping device X and being secured to a bracket X′, as shown in Fig. 15.

A transverse shaft R extends within the pedestal $k$ of the shirt board K and has fixed thereon an eccentric R′ located within an opening $s$ formed in a sliding member S. The lower portion of the sliding member S is provided with parallel portions S′ and S², to which the rack-bars L¹ and L² are secured. A ratchet wheel $r$ is fixed upon the projecting end of the shaft R and is adapted to be engaged by a pawl $r^2$, the latter being pivoted upon a lever R², mounted to oscillate upon the shaft R adjacent the ratchet wheel $r$. Rigidly secured to the top portion of the slide S is a tube $s'$ projecting beneath the top portion of the shirt board K toward the front end thereof, where it is rigidly connected with an arm $s^2$ depending from a slidable member $s^3$, mounted upon the upper surface of the shirt board K. Carried by the member $s^3$ is an upwardly projecting curved flange S³, having therein a slot $s^4$ to receive the collar button of a shirt band, as shown in Fig. 8. Rigidly secured to the upper surface of the shirt board K is an upwardly projecting flange S⁴ forming the central portion of the support for the back part of the shirt neck-band. At the sides of the flange S⁴ are adjustable curved flanged members S⁵ and S⁶ which are respectively connected by means of links $s^5$ and $s^6$ with the short arms of bell crank levers $t^5$ and $t^6$. The longer arms of the bell crank levers are slotted and overlap each other. A post $t^7$, carried by a plate $t^8$ on the member $s^3$, projects through the registering slots in the ends of the bell crank levers $t^5$ and $t^6$.

A reciprocating block T is mounted in a slot in the sliding member $s^3$ and carries a post $t$, which is detachably engaged by a sleeve $t^3$, carrying a depending curved flange T¹ overlying the central portion of the curved flange $S^3$ on the sliding member $s^3$. The block T (see Figs. 7 and 12) is provided with laterally projecting ears $t^1$ and $t^2$ which overlie the surface of the member $s^3$ on opposite sides of the slot therein, within which is located the block T. The ears $t^1$ and $t^2$ are provided with slots through which loosely extend screws $t^4$ secured to the underlying portions of the member $s^3$. The block T is also provided with a portion $T^2$ having an opening therein into which extends the upper end of a lever U fulcrumed intermediate of its ends upon the arm $s^2$, which depends from the member $s^3$. The lower end of the lever U extends into a slot $u^1$ in a rod $U^1$, located within and movable relatively to the tube $s^1$. The rod $U^1$ projects out of the tubes $s^1$, as shown in Fig. 4, where it is pivotally connected with one arm of a bell crank lever $u^2$ fulcrumed upon the sliding member S. The other arm of the bell crank lever $u^2$ is connected to the upper end of a rod $u^3$, the lower end of the latter being pivotally connected to a crank arm $U^3$ fixed to a rock shaft $u^4$. A handle lever $U^4$ is fixed to the rock shaft $u^4$ to oscillate the same.

A suitable yoke clamp is mounted upon the shirt board K for securing the yoke of the shirt to the end of the board adjacent the neckband support. Such yoke clamp may conveniently comprise a resilient tube V extending around the end of the shirt board and carried at the upper ends of levers $V'$ and $V^2$, the latter being fulcrumed at their lower ends upon the base $K^2$ of the shirt board. A rod $v'$, see Fig. 4, extends from the lever $V'$ to a crank $v^2$ projecting from a rock shaft $V^2$ mounted upon a fulcrum $V^3$. $V^4$ is a hand lever fixed to the rock shaft $V^2$, to oscillate the same and through the crank arm and rod $v'$ to oscillate the levers $V'$ and $V^2$, and with them the yoke clamp V toward or away from the adjacent end of the shirt.

Mounted upon the shirt board, adjacent the end thereof opposite to that at which the yoke clamp is located, is any suitable clamp for tightly securing the tail of the shirt to the board, such as indicated at W in Fig. 5. Any suitable means, such as indicated at $w$, may be provided for moving the clamp W toward and away from the adjacent end of the shirt board. Such means need not, however, be described in detail as they form no part of my invention.

The manner of using and operation of my improved machine for ironing shirt bosoms are as follows: A plurality of shirt supporting boards K are mounted upon the supporting track H. Upon each of the shirt boards is placed a laundried shirt, the bosom of which it is desired to iron. The neck-band of the shirt is buttoned around the flanges $S^3$, $S^4$, $S^5$ and $S^6$. To permit the same, the clamping member $T'$ is removed from the post $t$. Shaft R is then turned by reciprocating the hand lever $R^2$, which, through engagement of the pawl $r^2$ thereon with the teeth of the ratchet wheel $r$, turns the shaft R step by step. Such turning of the shaft R correspondingly moves the eccentric $R'$ which moves the sliding member S relatively to the shirt board in a direction away from the neck-band support. Such movement of the slide S is imparted through the tube $s'$ to the horizontal slide $s^3$, so that the latter is moved toward the right in Figs. 4 and 8. Such movement of the slide $s^3$ turns the bell crank levers $t^5$ and $t^6$, so that the links $s^5$ and $s^6$ move outwardly the sections $S^5$ and $S^6$ of the neck-band support. Coincidentally the flange $S^3$ is moved toward the right with the slide $s^3$. The neck-band of the shirt is therefore distended by reason of the movement away from each other of the sections $S^5$, $S^6$ and $S^3$. When the adjustment of the said sections has fully distended the neck-band, the turning of the shaft R is discontinued. The yoke of the shirt is then drawn smoothly over the end of the board and clamped thereto by proper operation of the clamp V. The shirt is stretched over the board and retained in such stretched condition by properly operating the clamp W to grip the tail of the shirt against the adjacent end of the board. The guard member $T'$ is then placed in position with the sleeve $t^3$ thereof around the post $t$. The hand lever $U^4$ is then oscillated in a direction to lift the rod $U^3$ and oscillate the bell crank lever $U^2$ so as to move the rod $U'$ toward the right in Figs. 4 and 8, thereby oscillating the lever U in a direction to move the block T toward the left, and to move the guard $T'$ into tight engagement with the portion of the neck-band which it overlies.

After the shirt has been secured to the supporting board in the manner above described, the rod $P^2$ is moved toward the right in Fig. 4, so as to disengage the pawl O from the support N, thereby permitting the spring $n$ to force the support downwardly and with it the post $N'$ into the path of the lugs $g$ on the chain G. The chain G moves in the direction of the hands of a watch, and hence the shirt board is moved by the chain from the right in Fig. 4 toward the series of ironing cylinders F, the first of which is omitted from Fig. 2 to more clearly disclose the underlying parts. When the chain has carried the shirt board to such a position that the lug $n^2$ rides upwardly on the fixed cam $h^5$, the post $N'$ is lifted above the engaged lug $g$ on the chain, so that while the movement of the chain continues, the movement of the shirt board therewith is discontinued. When the movement of the shirt board has thus been discontinued, the lugs $l'$ and $l^2$ on the rack-bars L' and L² have passed over the reciprocating dogs $m'$ and $m^2$, and such dogs engage the rear edges of the lugs, and as the blocks M' and M² are moved by the eccentrics M toward the first cylinder F, the shirt board is moved so as to project the front ends of the rack-bars L' and L² into the interrupted portions of the gear wheels $e^3$, and the rotation of such gear wheels causes the teeth thereon to mesh with the teeth on the rack-bars and thereby move the shirt board over the first pair of rollers E with the upper surface of the shirt bosom in contact with the first cylinder F.

Movement of the slide S in adjusting the neck-band support to fit within the neck-band of the shirt coincidentally adjusts the rack-bars L' and L² with respect to the base of the shirt board so that engagement of the rack-bars by the gear wheels $e^3$ occurs at such time that the recess $f$ in the first cylinder F will closely surround the neck-band of the shirt. The rack-bars are successively engaged by the pairs of gear wheels $e^2$ and $e'$, and the shirt board thereby moved beneath the succeeding cylinders F, the said cylinders being so geared together that the recess $f$ in each of them will closely surround the neck-band of the shirt as it passes beneath each cylinder.

The shirt board is moved through the engagement of the pair of gear wheels $e'$ with the rack-bars L' and L² toward the left beyond the last of the cylinders F a sufficient distance for the yielding trip X to engage the laterally projecting finger $o'$ on the pawl O and thereby oscillate the pawl in a direction to disengage the same from the support N so that the latter is depressed by the spring $n'$ and the post N' projected downwardly into the path of the next succeeding lug $g$ on the chain G. The chain thereby moves the shirt board along with it until the fixed cam $h^3$ engages the lug $n^2$ and again lifts the post N' out of engagement with the particular lug $g$ which has moved the board to such point. The movement of the board is consequently discontinued, so that the ironed shirt may be removed therefrom. The operator then pulls the rod P² toward the rear of the shirt board so as to again oscillate the pawl O and release the support N so as to project the post N' into the path of the next succeeding lug $g$ on the chain G. The chain then carries the shirt board with it until the fixed cam $h^4$ is reached, when the board is again disconnected from the chain and another operator places thereon a laundried shirt to be ironed. After such operator has properly secured the shirt in position, the rod P² is again pulled toward the rear of the board so that the next succeeding lug $g$ on the chain will engage the post N' and move the board with the chain until the fixed cam $h^5$ is reached. The said cam again disconnects the board from the chain so that it will be moved by the reciprocating blocks M' and M² into position for the pair of gear wheels $e^3$ to engage the rack-bars L' and L² and move the shirt board between the underlying pairs of rollers $e$ on the shafts E', E² and E³ and the overlying cylinders F.

Supported in front of the shirt board is a buffer Q connected at its center to a bar Q¹ mounted to reciprocate beneath the shirt board. The bar Q¹ bifurcates or carries forks $q^1$ and $q^2$ which engage beneath outwardly projecting lugs $n^3$ on the support N. Springs $q$ are interposed between the buffer Q and the front end of the shirt board so that the buffer is normally projected a slight distance in advance of the board. Should the board be drawn by the conveyer into contact with a stationary board in advance of it, the buffer Q will be forced inwardly against the tension of the springs $q$ thereby causing the inclined upper surfaces of the forks $q^1$ and $q^2$ to be moved relatively to the inclined lower surface on the lugs $n^3$ thereby lifting the support N and disengaging the post N¹ from its engagement with the chain conveyer. The shirt board is thereby automatically disconnected from the conveyer should it encounter the shirt board ahead of it.

From the foregoing description it will be observed that I have invented an improved machine for ironing shirt bosoms by means of which shirts of different sizes may be properly adjusted upon the carrying boards. It will be further seen that in my invention the support for the neck-band of the shirt is properly adjusted to distend the band of a shirt of any size, and coincidentally the propelling mechanism of the shirt board is so adjusted that the ironing cylinders will properly register with the adjusted position of the neck-band support.

While I have illustrated and described my invention as embodied in one convenient and practical form, yet I do not wish to be understood as being restricted thereto, as I contemplate changes in form, in the proportion of parts, and the substitution of equivalents as occasion may require or as may be deemed expedient.

I claim:—

1. In a machine of the character described, the combination with a board for supporting an article to be operated upon by the machine, of an adjustable form projecting from the surface of said board, a member adapted to engage the article supported on the surface of said board and having a recess therein to receive said form, mechanism for relatively moving said board and member into coöperative relation, and means for simultaneously adjusting said form and said mechanism to register said form with the recess in said member.

2. In a machine for ironing shirt bosoms, the combination with a board for supporting a shirt, of an adjustable neck band support mounted upon said board, an ironing member having a recess therein to receive said neck band support, mechanism for relatively moving said board and said member into coöperative relation, and means for simultaneously adjusting said neck band support and said mechanism to register said neck band support with said recess.

3. In a machine for ironing shirt bosoms, the combination with a board for supporting a shirt, of an adjustable neck band support mounted upon said board, a rotating ironing cylinder having a recess therein, mechanism for moving said board into coöperative relation with said cylinder, and means for simultaneously adjusting said neck band support and said mechanism to register said neck band support with the recess in said cylinder.

4. In a machine of the character described, the combination with a board for supporting an article to be operated upon by the machine, of an adjustable form projecting from the surface of said board, a member adapted to engage the article supported on the surface of said board having a recess therein to receive said form, a rack-bar adjustably secured to said board, a gear-wheel for engaging said rack-bar to move said board into engagement with said member, and means for simultaneously adjusting said form and said rack-bar relatively to said board to so regulate the engagement of said board with said member as to register said form with said recess.

5. In a machine of the character described, the combination with a board for supporting an article to be operated upon by the machine, of an adjustable form projecting from the surface of said board, a member adapted to engage the article supported on the surface of said board having a recess therein to receive said form, a rack-bar adjustably secured to said board, a gear-wheel for engaging said rack-bar to move said board into engagement with said member, means for simultaneously adjusting said form and said rack-bar relatively to said board to so regulate the engagement of said board with said member as to register said form with said recess, and conveying means for moving said board into position for said gear-wheel to engage said rack-bar.

6. In a machine for ironing shirt bosoms, the combination with a board for supporting a shirt, of an adjustable neck band support mounted upon said board, a rotating ironing cylinder having a recess therein, a rack-bar adjustably secured to said board, a gear-wheel rotating in unison with said cylinder for engaging said rack-bar to move said board into engagement with said cylinder, and means for simultaneously adjusting said neck band and said rack-bar relatively to said board to so regulate the engagement of said board with said cylinder as to register said neck band support with said recess.

7. In a machine for ironing shirt bosoms, the combination with a board for supporting a shirt, of an adjustable neck band support mounted upon said board, a rotating ironing cylinder having a recess therein, an endless conveyer having a path of movement passing adjacent said cylinder, means on said board adapted to engage said conveyer to adjust the movement therewith of said board, a rack-bar adjustably secured to said board, a gear-wheel rotating in unison with said cylinder for engaging said rack-bar to move said board into engagement with said cylinder, means for simultaneously adjusting said neck band support and said rack-bar relatively to said board to so regulate the engagement of said board with said cylinder as to register the neck band support with said recess, and means to automatically disengage said board from said conveyer prior to the engagement of said gear-wheel with said rack-bar.

8. In a machine of the character described, the combination with a board for supporting an article to be operated upon by the machine, of an adjustable form projecting from the surface of said board, a member adapted to engage the article supported on the surface of said board having a recess therein to receive said form, a rack-bar adjustably secured to said board, a gear-wheel for engaging said rack-bar to move said board into engagement with said member, means for simultaneously adjusting said form and said rack-bar relatively to said board to so regulate the engagement of said board with said member as to register said form with said recess, conveying means for moving said board into position for said gear-wheel to engage said rack-bar, means to automatically disengage said board from said conveyer prior to the engagement of said gear-wheel with said rack-bar, and means to automatically engage said board with said conveyer after the board has been moved past said cylinder by said gear-wheel and said rack-bar.

9. In a machine for ironing shirt bosoms, the combination with a rotating ironing cylinder, of an endless conveyer having a path of movement adjacent said cylinder, a board for supporting a shirt, adjustable means on said board for connecting the same with said conveyer, means for automatically actuating said adjustable means to disconnect said board from said conveyer at predetermined points in its travel, and means for manually operating said adjustable means to connect the board with the conveyer.

10. In a machine for ironing shirt bosoms, the combination with a rotating ironing cylinder, of an endless conveyer having a path of movement adjacent said cylinder, a board for supporting a shirt, adjustable means on said board for connecting the same with said conveyer, a rack-bar carried by said board, a gear-wheel rotated in unison with said cylinder, means for automatically actuating said adjustable means to disconnect said board from said conveyer prior to the engagement of said rack-bar with said gear-wheel, and means for automatically actuating said adjustable means to connect said board with said conveyer after the board has been moved past said cylinder by the engagement of the rack-bar with said gear-wheel.

11. In a machine for ironing shirt bosoms, the combination with a rotating ironing cylinder, of an endless conveyer having a path of movement adjacent said cylinder, a board for supporting a shirt, adjustable means on said board for connecting the same with said conveyer, a rack-bar carried by said board, a gear-wheel rotated in unison with said cylinder, means for automatically actuating said adjustable means to disconnect said board from said conveyer prior to the engagement of said rack-bar with said gear-wheel, automatic means operating after the disconnection of said board from said conveyer for moving said board into position for said rack-bar to be engaged by said gear-wheel, and means for automatically actuating said adjustable means to connect said board with said conveyer after the board has been moved past said cylinder by the engagement of the rack-bar with said gear-wheel.

12. In a machine for ironing shirt bosoms, the combination with a rotary ironing cylinder, of an endless conveyer having a path of movement adjacent said cylinder, a board for supporting a shirt, a coupling member carried by said board and movable into and out of engagement with said conveyer, a fixed tripping device located adjacent the path of movement of said conveyer to disengage said coupling member from the conveyer, and a manually-operated device on said board for effecting the movement of said coupling member into engagement with said conveyer.

13. In a machine for ironing shirt bosoms, the combination with a rotary ironing cylinder, of an endless conveyer having a path of movement adjacent said cylinder, a board for supporting a shirt, a spring-actuated plunger supported on said board and movable into engagement with said conveyer, supporting means for holding said plunger out of engagement with said conveyer, a tripping device located adjacent the path of said conveyer for moving said plunger out of engagement with said conveyer and into engagement with said supporting means, and manually-operated means on said board for actuating said supporting means to release the plunger and permit its engagement with said conveyer.

14. In a machine for ironing shirt bosoms, the combination with an ironing member, of an endless track extending adjacent said member, an endless conveyer having a path adjacent said track, a plurality of shirt-carrying boards supported on said track, means for individually connecting said boards with said conveyer, means located at predetermined points adjacent said track to automatically successively disengage the boards from said conveyer, and means for separately engaging each board with said conveyer.

15. In a machine for ironing shirt bosoms, the combination with a rotary ironing cylinder, of an endless conveyer having a path of movement adjacent said cylinder, a board for supporting a shirt, a coupling member carried by said board and movable into and out of engagement with said conveyer, a fixed tripping device located adjacent the path of movement of said conveyer to disengage said coupling member from the conveyer, a manually-operated device on said board for effecting the movement of said coupling member into engagement with said conveyer, and means carried by said board for automatically disengaging said coupling member from the conveyer when said board contacts another board in advance thereof.

16. In a machine for ironing shirt bosoms, the combination with a rotary ironing cylinder, of an endless conveyer having a path of movement adjacent said cylinder, a board for supporting a shirt, a spring-actuated plunger supported on said board and movable into engagement with said conveyer, supporting means for holding said plunger out of engagement with said conveyer, a tripping device located adjacent the path of said conveyer for moving said plunger out of engagement with said conveyer and into engagement with said supporting means, manually-operated means on said board for actuating said supporting means to release the plunger and permit its engagement with said conveyer, and means carried by said board for automatically lifting said plunger out of engagement with said conveyer when said board contacts with another board in advance thereof.

17. In a machine for ironing shirt bosoms, the combination with an ironing member, of an endless track extending adjacent said member, an endless conveyer having a path adjacent said track, a plurality of shirt-carrying boards supported on said track, means for individually connecting said boards with said conveyer, means located at predetermined points adjacent said track to automatically successively disengage the boards from said conveyer, means for separately engaging each board with said conveyer, and means carried by each of said boards for automatically disconnecting any board from the conveyer when it contacts with another board in advance thereof.

In testimony whereof, I have subscribed my name.

WILLIAM R. HAGER.

Witnesses:
   J. WEBB GRIFFEN,
   GEO. L. WILKINSON.